US006459728B1

(12) United States Patent
Bar-David et al.

(10) Patent No.: US 6,459,728 B1
(45) Date of Patent: Oct. 1, 2002

(54) ITERATIVE CHANNEL ESTIMATION

(75) Inventors: Israel Bar-David, Haifa (IL); Carlo Luschi, Oxford (GB); Ran-Hong Yan, Longcot (GB)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/302,764

(22) Filed: Apr. 30, 1999

(30) Foreign Application Priority Data

Apr. 30, 1998 (EP) ............................................. 98303418

(51) Int. Cl.$^7$ ............................................. H04L 27/01
(52) U.S. Cl. ........................ 375/231; 375/232; 375/340; 375/350
(58) Field of Search ................................ 375/231, 232, 375/340, 348–350

(56) References Cited

U.S. PATENT DOCUMENTS

| | | | | | |
|---|---|---|---|---|---|
| 5,185,764 A | * | 2/1993 | Baier et al. | .................... | 375/13 |
| 5,537,419 A | * | 7/1996 | Parr et al. | ................. | 370/100.1 |
| 6,148,023 A | * | 11/2000 | Pelin et al. | .................. | 375/206 |

FOREIGN PATENT DOCUMENTS

| WO | PCT/SE93/00477 | 5/1993 | ........... H04B/7/005 |
|---|---|---|---|

OTHER PUBLICATIONS

Mignone, V. et al "A New Channel Estimation Method To Improve The Spectrum Efficiency In Digital Terrestrial Television Systems" "International Broadcasting Convention 1994 No. 413 Sep. 14, 1995" pp. 122–128.

WU, L. et al "A New Short–Block Digital Transmission Scheme With Adaptive MLSE For Mobile Radio Channels" "Proceedings Of The Vehicular Technology Conference, Stockholm Jun. 8–10, 1994" pp. 243–247.

Bair, A. et al "Bit Synchronization And Timing Sensitivity In Adaptive Viterbi Equalizers for Narrowband–TDMA Digital Mobile Radio Systems" "38$^{th}$ IEEE Vehicular Technology Conference: Telecommunications Freedom—Technology On The Move Philadelphia, PA Jun. 15–17, 1988" pp. 377–384.

D'Avella, R. et al "An Adaptive MLSE Receiver For TDMA Digital Mobile Radio" "IEEE Journal On Selected Areas In Communications Jan. 1989, vol. 7 No. 1" pp. 122–129.

Chang, K. et al "Iterative Joint Sequence And Channel Estimation For Fast Time–Varying Intersymbol Interference Channels" "Communications—Gateway To Globalization Proceedings Of The International Conference On Communications, Seattle, WA Jun. 18–22, 1995 vol. 1" pp. 357–361.

Fukawa, K. et al "Adaptive Equalization With RLS–MLSE For Frequency Selective Fast Fading Mobile Radio Channels" "Countdown To The New Milennium, Phoenix, AZ Dec. 2–5, 1991 vol. 1" pp. 548–552.

Baier, A. "Correlative And Iterative Channel Estimation In Adaptive Viterbi Equalizers For TDMA Mobile Radio Systems" "Stochastic Models And Methods In Information Technology Nurenberg, W. Germany Apr. 12–14, 1989 vol. 107" pp. 363–368.

(List continued on next page.)

Primary Examiner—Amanda T. Le
(74) Attorney, Agent, or Firm—Richard J. Botos

(57) ABSTRACT

A method and apparatus for estimating channel impulse response and data in a signal transmitted over a channel in a communication system. The channel impulse response is estimated uses correlative channel sounding, and then, using the estimated channel impulse response, the data in the signal is estimated. The output is then fed back to the channel impulse response estimator and the channel impulse estimation is repeated. The data estimation and channel impulse response estimation may be iterated a number of times.

7 Claims, 3 Drawing Sheets

OTHER PUBLICATIONS

Baler, A. et al "Simulation And Hardware Implementation Of A Viterbi Equalizer For The GSM TDMA Digital Mobile Radio System" "Proc. 3'd Nordic Seminar On Digital Land Mobile Radio Communications, Sep. 1988" pp. 13.7.1–13.7.5.

Bauch, G. et al "Iterative Equalization And Decoding In Mobile Communications Systems" "Proc. EPMCC '97, ITG–Fachbericht No. 145, VDE Verlag, Oct. 1997" pp. 307–312.

European Search Report, Dated Sep. 18, 1998.

* cited by examiner

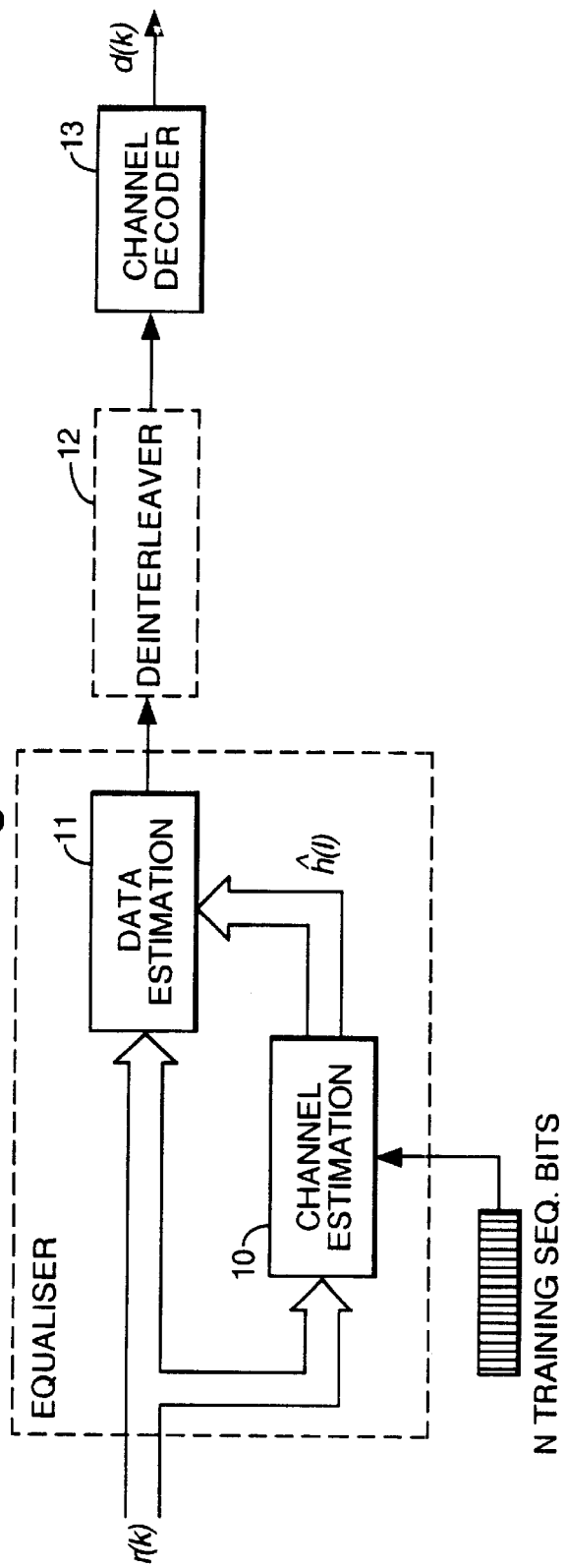

ITERATIVE CHANNEL ESTIMATION

CROSS-REFERENCE TO RELATED APPLICATION

This application claims priority of European Patent Application No. 98303418.2, which was filed on April 30, 1998.

FIELD OF THE INVENTION

This invention relates to channel and data estimation methods and apparatus in mobile radio communications and in particular to an equalizer that compensates for channel distortion by iterating data and channel estimation procedures on a block-by-block basis.

BACKGROUND OF THE INVENTION

In digital mobile radio communications, transmission channels suffer from severe distortion due to frequency selective fading. In addition, channel characteristics are normally time-varying due to the relative motion of fixed and mobile stations. Therefore, in order to allow for reliable transmission, the receiver must be able to estimate and compensate for channel distortion on a block-by-block basis. Various channel estimation and channel equalization methods have been proposed in literature and are commonly used in practical systems such as mobile cellular communication systems employing the European wireless digital cellular standard "GSM'. In most cases the receiver performs channel equalization on the received signal using Maximum Likelihood (ML) or Maximum A Posteriori (MAP) probability data estimation, based on the knowledge of the Channel Impulse Response (CIR). Most practical systems employ training sequences to enable the CIR to be estimated before the equalizer start-up. Fast time varying, fading channels require the changing channel response to be tracked and adjusted dynamically by the receiver for the duration of the received signal. Tracking of the CIR may be performed by means of decision directed algorithms, where tentative decisions from the equalizer are used to update the initial CIR estimate. Examples of receiver systems which perform channel estimation and channel equalization may be found in the following articles: "Bit Synchronization and Timing Sensitivity in Adaptive Viterbi Equalizers for Narrowband TDMA Digital Mobile Radio 25 Systems", A. Baler, G. Heinrich and U. Wellens, Proc. IEEE Vehicular Technology Conference, June 1988, pp 377–384; "Correlative and Iterative Channel Estimation in Adaptive Viterbi Equalizers for TDMA Mobile Radio", ITG-Fachbericht No. 107, VDE Verlag, April 1989, pp 363–368; "Simulation and Hardware Implementation of a Viterbi Equalizer for the GSM TDMA Digital Mobile Radio System", A. Baler, G. Heinrich, P. Shoeffel and W. Stahl, Proc. 3'd Nordic Seminar on Digital Land Mobile Radio Communications, September 1988 pp. 13.7.1. 13.7.5.

The effectiveness of the channel estimation strategy, and thus the overall equalization performance, depends heavily on the reliability of the initial CIR estimate. There is a requirement for an improved estimation strategy that can function with or without training sequences.

SUMMARY OF THE INVENTION

According to a first aspect of the invention there is provided a method of estimating channel impulse response and data in a signal transmitted over a channel in a communication system. The method estimates the channel impulse response using correlative channel sounding. The estimated channel impulse response is used to estimate the data in the signal, and an output is provided. The channel impulse response estimating step is repeated, at least once, using the previous output and an improved channel impulse response estimate is provided, for use in a repeated data estimating step.

According to a second aspect of the invention there is provided apparatus for estimating channel impulse response and data in a signal transmitted over a channel in a communication system. The apparatus has a channel impulse response estimator for providing an initial channel impulse response estimate using correlative channel sounding, a data estimator for providing an initial estimate of data in the transmitted signal, and an output. The channel impulse response estimator has a first input for receiving the transmitted signal, a second input for receiving a feedback signal from the apparatus output, and an output. The data estimator has a first input for receiving the channel impulse response estimate, a second input for receiving the transmitted signal, and an output.

The invention provides a reduced-noise CIR estimate, which is needed for the equalization of the received signal, in the case of multipath propagation environment, and thus provides improved receiver performance.

The equalizer performance is improved considerably by iterating the data and channel estimation procedure on a block-by-block basis. In particular, after a first pass in which the initial channel estimate is obtained by resorting to the known training bits, one or more iteration can be performed, using data symbol decisions from the equalizer output derived in the previous iteration, together with the original training sequence, to obtain a new CIR estimate.

In systems in which the information bits are encoded (and possibly interleaved) prior to modulation, the above strategy can be further improved by using the more reliable decisions obtained by a) re-encoding (and possibly re-interleaving) the channel decoder output, or b) simply taking (and possibly re-interleaving) the most significant bit of the A Posteriori values for the coded bits provided by a soft-in/soft-out channel decoder. Computer simulations carried out for the particular case of the GSM TCWFS transmission scheme show that, as compared with the conventional channel estimation approach (that is, correlative channel sounding by training sequence), the invention provides a significant performance improvement even with just one iteration.

The invention may also be used in those cases where no training sequence is available and the data estimation is performed by starting with an arbitrary channel estimate.

BRIEF DESCRIPTION OF THE DRAWINGS

A detailed description of a practical digital radio receiver is described below, by way of example, and with reference to the following figures in which:

FIG. 1 shows in outline a typical GSM digital radio receiver;

FIG. 2 illustrates the GSM "normal" burst format; and

DETAILED DESCRIPTION

Figure 3:
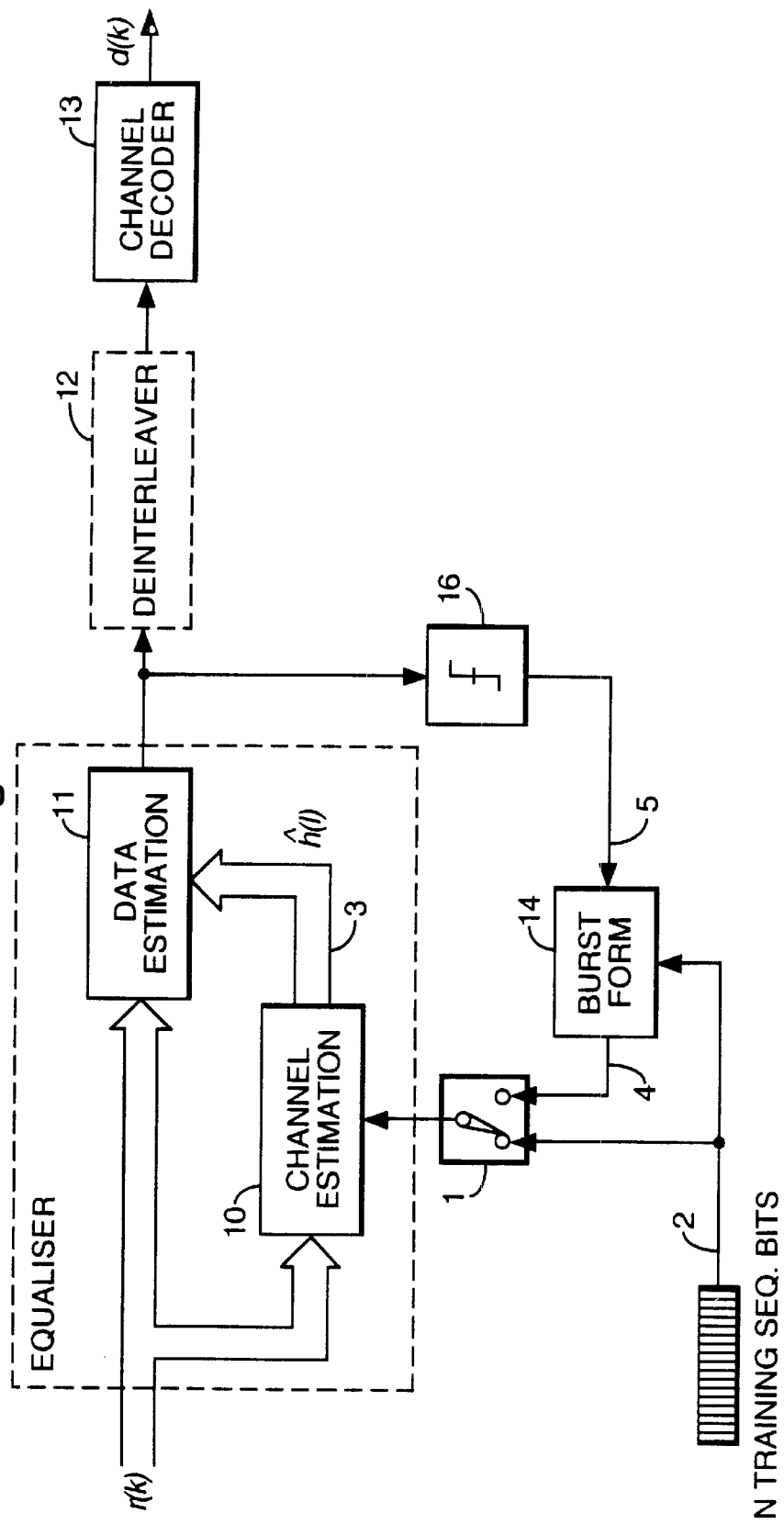
FIG. 3 illustrates a digital radio receiver according to the invention for the case of feedback from the equalizer output.

A typical implementation of a digital radio receiver is shown in FIG. 1. The discrete-time received signal can be written as $$r(k) = \sum_{l}^{L-1} b(k-l)h(l) + n(k) \quad (1)$$

where $b(k) \in \{-1,1\}$ are the transmitted data symbols, or the (known) training sequence symbols, $h(l), l=0,1, \ldots, L-1$ represents the samples of the Channel Impulse Response (CIR) and $n(k)$ indicates white Gaussian noise with zero means and variance $\sigma^2$.

The receiver must first estimate the CIR $h(l)$, before beginning the data estimation process. In some cases, e.g. in a GSM standard receiver, the initial CIR estimation is commonly performed by means of correlative channel sounding. The samples of the CIR estimate are obtained by correlating the received signal $r(k)$ with N=16 bits $b(k)$ out of the 26 bits of training sequence, shown in FIG. 2. The result of the correlation is:

$$\hat{h}(l) = (1/N) \sum_{i=0}^{N-1} b(i) r(l+i) \quad (2)$$

where $\hat{h}(l) l=0,1, \ldots, L-1$ represents the samples of the estimated CIR.

In the case of ML channel estimation on 1 obtains:

$$\hat{h} = [\hat{h}(0), \hat{h}(L-1), \ldots, \hat{h}(L-1)]^T = (B^T B)^{-1} B^T r \quad (3)$$

where $r = [r(0), r(1), \ldots, r(N-1)]^T$ $B = [b(0), b(1), \ldots, b(N-1)]^T$ $b(i) = [b(i), b(i-1), \ldots b(i-L+1)]^T$ It can be seen that, due to the good autocorrelation properties of the GSM training sequence ($B^T B \approx NI$) and Equation 2 is the particular case of the more general ML channel estimation technique (equation 3). Once the channel estimate is available, the estimation of the data symbol sequence is performed. If the channel cannot be considered approximately constant within one burst, the initial channel estimate may be updated during the burst by using tentative decisions at the equalizer output.

In the case where the information data are encoded (and interleaved), the equalizer output sequence is finally (de-interleaved and) decoded, as shown in FIG. 1.

An iterative joint data and channel estimation procedure performed on a burst-by-burst basis have been proposed by K. H. Chang and C. N. Georghiades in "Iterative Join Sequence and Channel Estimation for Fast Time-Varying Intersymbol Interference Channels", Proc. IEEECC'95, Seattle, Wash. 1995, pp. 357–361. In this work, after a first pass where an initial channel estimate is obtained by resorting to the known training sequence bits, one or more iterations can be performed where data symbol decisions at the equalizer output for the previous iteration are employed to obtain a new initial CIR estimate by the ML approach (3). However, the above ML approach requires matrix inversion operations, which involve a significant 10 implementation complexity. On the other hand, the symbol decision sequence fed back from the equalizer output does not possess in general the autocorrelation properties required by the economically advantageous channel sounding approach (2). In addition, and in contrast to the use of known training sequence bits, the symbol decision feedback may contain a certain number of errors. For this reason, the use of correlative channel sounding has not been proposed for channel estimators that do not rely on known training sequence bits. An advantage of the invention is in the much lower implementation complexity with respect to the scheme proposed in K. H. Chang above. In addition, although the decision feedback sequence in general does not possess the autocorrelation properties required by the channel sounding approach, and although the decision feedback sequence may contain a significant number of errors, these drawbacks are more than compensated by the fact that, when the length of the sounding sequence is enlarged, the estimation noise is drastically reduced. In contrast to K. H. Chang above, the invention uses decision feedback from the decoder output, as shown in FIG. 4.

Figure 4:
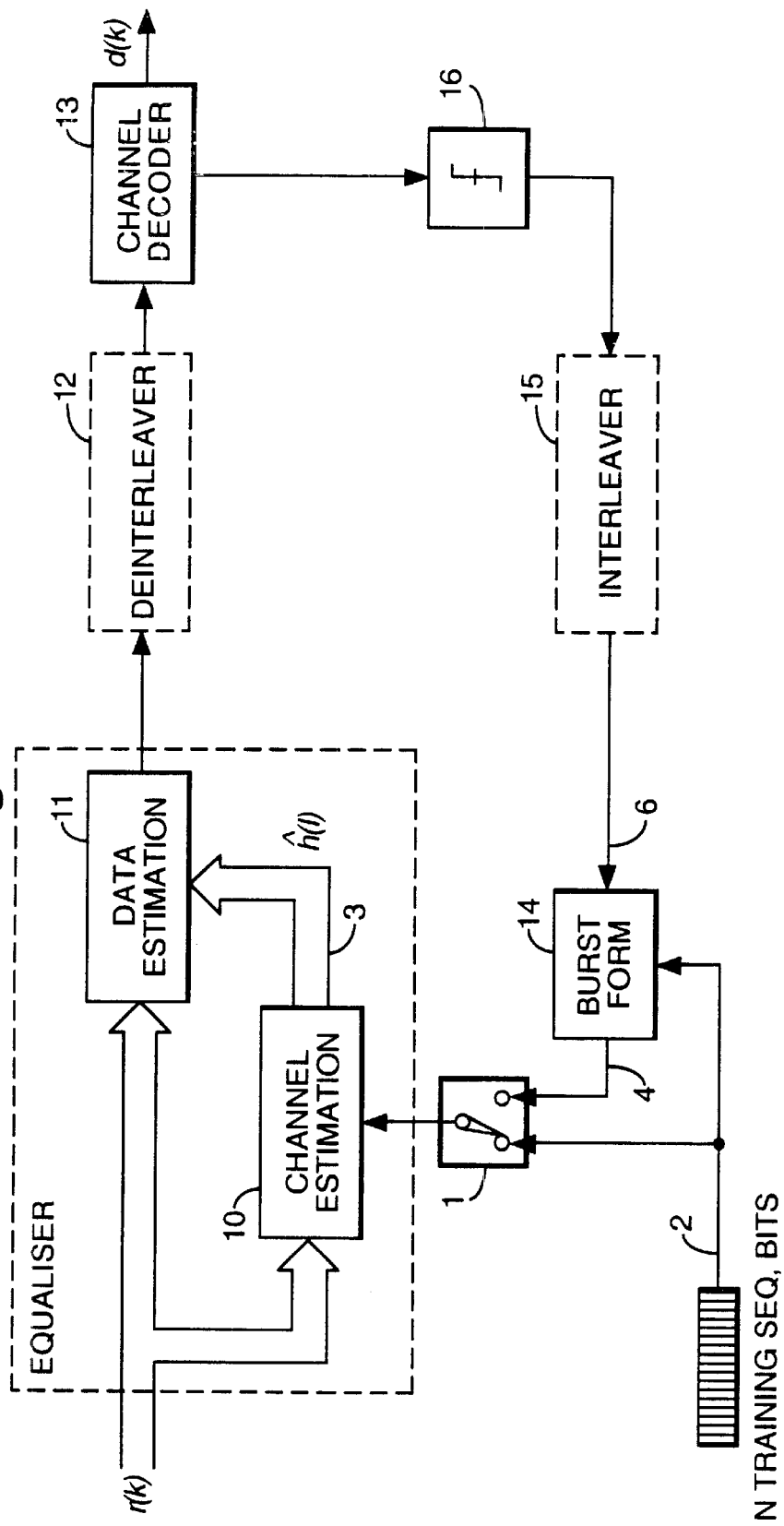
FIG. 4 illustrates another digital radio receiver according to the invention for the case of feedback from the decoder output.

An implementation of a receiver according to the invention is shown in FIG. 3 and FIG. 4. The invention includes iterating the processes of channel estimation, data estimation, and decoding, performed by the conventional receiver of FIG. 1.

The iteration procedure can be summarised as follows:

1) For each received burst, a first pass is performed in which channel and data estimation are obtained by the conventional approach of the prior art. As an example, in the case of GSM, the initial channel estimation can be performed by using correlative channel sounding estimation (2) and possibly updated during the burst by a decision directed algorithm. In FIG. 3 the switch selects the input signal 2. The initial channel estimate is represented by the complex signal 3.

2) One or more iteration are then performed, in which a feedback of the decisions from either the equalizer output, as shown in FIG. 3, or the decoder output, as shown in FIG. 4, is used to provide an increased length of the sounding data sequence, as compared with the sequence employed in the initial channel estimation. As an example, in the case of the GSM TCWFS burst (ETSI GSM 05.02: "Digital Cellular Telecommunications System (Phase 2+); Multiplexing and Multiple Access on the Radio Path", Version 5.2.0, November 1996), the feedback of the decisions for the 114 data bits provides a pseudo training sequence of N=142 bits. Using this sequence, the new channel estimation may be performed according to equation 2, as used on the first pass of the iteration. In FIG.3, for each iteration after the first pass, the switch 1 selects the pseudo training sequence (signal 4). This sequence is obtained by formatting the data bits (output of the slicer 16) and the original training sequence bits (signal 2) in the actual burst structure. In the case of decision feedback from the equalizer output, as shown in FIG. 3, the slicer 16 selects the input signal at the output of the equalizer and provides the output signal on line 5.

In systems where the information bits are encoded (and possibly interleaved) prior to modulation, the performance of the receiver of FIG. 3 can be further improved by using a feedback of the more reliable decisions obtained from the decoder output as shown FIG. 4. In a receiver implementing an iterative equalization and decoding scheme, the symbol decisions can be obtained from the A Posteriori values for the coded bits provided by a soft-in/soft-out channel decoder.

Referring to FIG. 4, in the case of feedback from the decoder output, the slicer 16 selects the signal at the output of channel decoder 13. The switch 14 receives the input signal 6, which represents a) the re-encoded (and re-interleaved) version of the channel decoder hard-output, or b) the (re-interleaved) most significant bit of the log-likelihood ratios (or L-values) for the coded bits provided by a soft-in/soft-out decoder, typically employed in an iterative equalization and decoding scheme (see e.g. G. Bauch H. Khorram, and J. Hagenauer. "Iterative Equalization and Decoding in Mobile Communication Systems", Proc. EPMCC '97, ITG-Fachbericht No. 145, VDE Verlag, October 1997, pp. 307–312). Apart from this difference, the channel estimator functions according to the same strategy described for steps (1) and (2) above.

Simulation results prove that, in the case of GSM system, the invention provides an improvement of about 0.8–1.2 dB in terms of receiver sensitivity after just one iteration. The improvement is about 0.8 dB using the data estimates provided by the equalizer and about 1.2 dB using the feedback from the output of the channel decoder. This, in addition to the low implementation complexity, especially if compared to the use of a ML channel estimator, makes the invention particularly suitable for digital mobile radio receivers.

The iterative strategy with decision feedback from the channel decoder output can also be used in those cases where no training sequence is available and the data estimation is performed starting with an arbitrary channel estimate.

While the invention has been described with reference to a preferred embodiment, it will be understood by those skilled in the art having reference to the specification and drawings that various modifications may be made and various alternatives are possible therein without departing from the spirit and scope of the invention.

What is claimed is:

1. A method of estimating an initial channel impulse response for a signal transmitted over a channel in a communication system the method comprising:

estimating the channel impulse response using correlative channel sounding;

using the estimated channel impulse response to estimate the data in the signal;

outputting the estimated data and repeating, at least once, said channel impulse response estimating step using a previous output estimated data and thus providing an improved channel impulse response estimate, for use in a repeated data estimating step.

2. The method as claimed in claim 1, wherein the signal is transmitted in blocks.

3. The method as claimed in claim 2, wherein the channel impulse response is estimated for each block.

4. The method as claimed in claim 2, wherein the repeated estimating step is performed on a block-by-block basis.

5. The method as claimed in claim 4, wherein the channel impulse response estimating step is associated with one block of data.

6. The method as claimed in claim 1, wherein the output provided is representative of estimated data.

7. Apparatus for estimating an initial channel impulse response for a signal transmitted over a channel in a communication system comprising:

a channel impulse response estimator for providing, on an output thereof, an initial channel impulse response estimate using correlative channel sounding, the channel impulse estimator having an input for receiving the transmitted signal; and a data estimator for providing, on an output thereof, an initial estimate of data in the transmitted signal, the data estimator having a first input for receiving the channel impulse response estimate, and a second input for receiving said transmitted signal, wherein the channel impulse response estimator has a further input for receiving a feedback signal from the output of the data estimator, such that there is provided an improved channel impulse response based on a previous output of the channel impulse response estimator, for use by the data estimator.

* * * * *